US009328311B2

(12) United States Patent
Jenkins et al.

(10) Patent No.: US 9,328,311 B2
(45) Date of Patent: May 3, 2016

(54) METHODS AND SYSTEMS FOR BIO-OIL RECOVERY AND SEPARATION AIDS THEREFOR

(71) Applicant: Buckman Laboratories International, Inc., Memphis, TN (US)

(72) Inventors: Donald G. Jenkins, Memphis, TN (US); William C. Ganus, Memphis, TN (US); Carlton E. Hagen, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 146 days.

(21) Appl. No.: 14/037,398

(22) Filed: Sep. 26, 2013

(65) Prior Publication Data

US 2014/0171670 A1    Jun. 19, 2014

Related U.S. Application Data

(60) Provisional application No. 61/739,218, filed on Dec. 19, 2012.

(51) Int. Cl.
| | | |
|---|---|---|
| C11B 1/00 | (2006.01) | |
| C11B 1/10 | (2006.01) | |
| C11B 13/00 | (2006.01) | |

(52) U.S. Cl.
CPC . *C11B 1/10* (2013.01); *C11B 13/00* (2013.01); *Y02W 30/74* (2015.05)

(58) Field of Classification Search
CPC .......... C11B 1/10; C11B 13/00; Y02W 30/74
USPC .......................................................... 554/19
See application file for complete search history.

(56) References Cited

U.S. PATENT DOCUMENTS

| | | |
|---|---|---|
| 3,301,881 A | 1/1967 | Davis |
| 4,155,770 A | 5/1979 | Doumani |
| 4,702,798 A | 10/1987 | Bonanno |
| 5,250,182 A | 10/1993 | Bento et al. |
| 5,283,322 A | 2/1994 | Martin et al. |
| 5,558,781 A | 9/1996 | Buchold et al. |
| 6,013,157 A | 1/2000 | Li et al. |
| 6,403,344 B1 | 6/2002 | Marellapudi et al. |
| 6,548,102 B2 | 4/2003 | Fenske et al. |

(Continued)

FOREIGN PATENT DOCUMENTS

GB            360332        11/1931

OTHER PUBLICATIONS

International Search Report and Written Opinion issued in corresponding International Patent Application No. PCT/US2013/061781 dated Jun. 25, 2014 (15 pages).

(Continued)

*Primary Examiner* — Deborah D Carr
(74) *Attorney, Agent, or Firm* — Kilyk & Bowersox, P.L.L.C.

(57) ABSTRACT

A method and system for bio-oil recovery from biomass are provided which includes adding at least one separation aid to stillage that contains oil to form a treated stillage prior to centrifuging the stillage, and centrifuging the treated stillage in at least one centrifuge to separate at least a portion of the oil from the treated stillage. The separation aid can contain at least one lecithin and at least one oil and optionally at least one surfactant having an HLB value of at least 6. Treated stillage products are also provided which can contain the indicated separation aid and recovered oil.

51 Claims, 6 Drawing Sheets

(56) References Cited

U.S. PATENT DOCUMENTS

| | | | |
|---|---|---|---|
| 7,309,602 | B2 | 12/2007 | David |
| 8,841,469 | B2 | 9/2014 | Shepperd et al. |
| 8,962,059 | B1 | 2/2015 | Froderman et al. |
| 2004/0087808 | A1 | 5/2004 | Prevost et al. |
| 2007/0210007 | A1 | 9/2007 | Scheimann et al. |
| 2007/0238891 | A1 | 10/2007 | Winsness et al. |
| 2008/0110577 | A1 | 5/2008 | Winsness |
| 2011/0283602 | A1 | 11/2011 | Gallop et al. |
| 2012/0245370 | A1 | 9/2012 | Sheppard et al. |
| 2013/0048238 | A1* | 2/2013 | Glover .............. D21H 21/146 162/111 |

OTHER PUBLICATIONS

Flottweg Se, "Flottweg Centrifuges for High Efficient Stillage Separation in Bioethanol Production," Flottweg Separation Technology, Technical Data, Germany, pp. 1-8.

International Preliminary Report on Patentability issued in corresponding International Patent Application No. PCT/US2013/061781 dated Feb. 9, 2015 (33 pages).

PCT International Search Report in corresponding International Patent Application PCT/US2013/061781, dated Feb. 21, 2014 (5 pages).

Buckman's Motion for Summary Judgment as to the Invalidity of Solenis's Patents Under the "Public Use" Doctrine filed Nov. 2, 2015, Civil Action No. 2:15-cv-02063-JPM-tmp, 465 pages.

Solenis' Memorandum of Law in Opposition to Buckman's Motion for Summary Judgment of Invalidity filed Dec. 3, 2015, Civil Action No. 2:15-cv-02063-JPM-tmp, 153 pages.

Buckman's Reply in Support of its Motion for Summary Judgment of Invalidity filed Dec. 21, 2015, Civil Action No. 2:15-cv-02063-JPM-tmp, 20 pages.

Alther, G., "Put the Breaks on," Chemical Engineering, Mar. 1998, vol. 5, No. 3, (10 pages).

Dictionary.com, http://dictionary.reference.comlbrowse/aqueous, definition of "Aqueous," last accessed Jul. 12, 2015, (4 pages).

Babayan, V. K., "Specialty Lipids and Their Biofunctionality," LIPIDS, 1987, vol. 22, No. 6, pp. 417-420.

Davis, K. S., "Corn Milling, Processing and Generation of Co-Products," Minnesota Nutrition Conference, Technical Symposium, Sep. 11, 2001, 7 pages.

Declaration of David A. Rockstraw, Ph.D., P.E. ('059 Patent), 89 pages.

Declaration of David A. Rockstraw, Ph.D., P.E. ('469 Patent), 110 pages.

Food and Drugs, 21 C.F.R. § 172.840, "Polysorbate 80," WestlawNext, 2015, 3 pages.

Food and Drugs, 21 C.F.R. § 573.860, "Polysorbate 80," WestlawNext, 2015, 1 page.

Frison-Norrie et al., "Investigating the Molecular Heterogeneity of Polysorbate Emulsifiers by MALDI-TOF MS," J. Agric. Food Chem., Jul. 2001, vol. 49, Issue 7, pp. 3335-3340.

"The HLB System a time-saving guide to emulsifier selection," Chemminique, ICI Americas Inc., Mar. 1980, 22 pages.

International Union of Pure and Applied Chemistry, "Compendium of Chemical Terminology," Second Edition, 1997, pp. 16, 166 (4 pages).

UPAC-IUB Commission on Biochemical Nomenclature, "The Nomenclature of Lipids," Biochem J., vol. 171, Issue 1, Apr. 1978, pp. 21-35, (15 pages).

McCutcheon's Division, "McCutcheon's Volume 1: Emulsifiers & Detergents," North American Edition, 1997, p. 211, (4 pages).

Mukerjee et al., "Critical Micelle Concentrations of Aqueous Surfactant Systems," Nat. Stand. Ref. Data Ser., Nat. Bur. Stand. (U.S.), Feb. 1971, 7 pages.

Mukesh et al., "Lipase Catalysed Esterification of Isosorbide and Sorbitol," Biotechnology Letters, vol. 15, No. 12, Dec. 1993, pp. 1243-1246.

\* cited by examiner

METHODS AND SYSTEMS FOR BIO-OIL RECOVERY AND SEPARATION AIDS THEREFOR

This application claims the benefit under 35 U.S.C. §119 (e) of prior U.S. Provisional Patent Application No. 61/739,218, filed Dec. 19, 2012, which is incorporated in its entirety by reference herein.

FIELD OF THE INVENTION

The present invention relates to a method and system for bio-oil recovery. A separation aid that can be used in these methods and systems, and products containing same, is also provided.

BACKGROUND OF THE INVENTION

Ethanol production from biomass has received significant attention in recent years as a source of alternative fuel or biofuel. Ethanol burns more cleanly than fossil fuels, and can be produced using renewable resources such as grains or other renewable starch-containing biomass. A widely used method of producing ethanol from grains is known as "dry milling," and usually is practiced using corn in the United States. The dry milling process usually uses the starch in the corn or other renewable biomass to produce ethanol through fermentation, which creates a waste stream comprised of byproducts termed "whole stillage." Whole stillage may be further separated by centrifuge into products known as "wet distillers grains" (WDG) and "thin stillage." Despite containing valuable oil, whole stillage and thin stillage usually has been treated as waste or used primarily to supplement animal feed, mostly in the form of distillers dried grains with solubles (DDGS). DDGS typically is produced by evaporating the thin stillage, and recombining the resulting concentrate or syrup with the wet distillers grains, and drying the product to have a low moisture content.

Efforts to recover the valuable oil from stillage have encountered significant obstacles. For example, previous use of flash point hydrocarbon solvents, alcohols or polyhydroxy alcohols as extraction solvents for bio-oils have drawbacks. These compounds, while effective, require high concentrations for bio-oil separation which results in potential safety issues. Regulatory requirements for animal feed also has precluded use of these compounds in bio-oil separation, especially in corn fermentation. Another approach involves attempting to separate the oil directly from the thin stillage before the evaporation stage, such as using a centrifuge. However, spinning the thin stillage at this stage does not produce usable oil, but rather merely creates an undesirable emulsion phase requiring further processing. U.S. Pat. No. 5,250,182 shows the use of multiple filters for removing solids and recovering lactic acid and glycerol from thin stillage without the need for evaporation. Filters, and especially the microfiltration and ultrafiltration types proposed for use in the '182 patent, are susceptible to blockage and thus require monitoring and maintenance for this reason. U.S. Patent Application Publication No. 2007/0238891 shows a method of freeing bound oil present in whole stillage and thin stillage, which involves heating the stillage to a temperature said to be sufficient to at least partially separate oil therefrom for recovery from the stillage. In one embodiment, the '891 publication shows the further step of pressurizing the heated stillage to prevent boiling as a form of pressure cooking the stillage.

Algae are another form of biomass that has great potential as a source of bio-oil. As with fermented grains like corn, a number of challenges previously have existed in recovering usable oil in quantity and quality from algae feedstock. One challenge is recovering the desired hydrocarbon molecules from the algae. An option for recovering hydrocarbon products from algae can be to use a solvent extraction based method. Unfortunately, some solvent based methods require use of an algae source that contains little or no water. Dehydration of an algae source to a sufficient degree to allow for this type of solvent extraction can require a high cost of operation. Alternative solvent extraction methods can allow for extraction from an algae sample that contains water. However, a high cost step usually remains, as the solvent has to be separated from the water, for example by distillation.

The present inventors have recognized that there is a need for safer and more efficient, versatile, and economical processes for recovering bio-oil from biomass, such as stillage or algae or other biomass.

SUMMARY OF THE PRESENT INVENTION

A feature of the present invention is to provide a method for recovering bio-oil from biomass, such as stillage or algae.

An additional feature of the present invention is to provide a method for bio-oil recovery from stillage byproduct of a biomass fermentation process wherein a separation aid can be added to stillage that contains bio-oil to form a treated stillage prior to centrifuging the stillage to provide efficient oil separation and recovery when the treated stillage is centrifuged.

Another feature of the present invention is to provide a composition comprising lecithin and hydrocarbon oil which is useful for separating oil from stillage or other biomass.

A further feature of the present invention is to provide a system with interoperable equipment to supply and apply the indicated separation aid that is useful for separating oil from stillage or other biomass, and a separating unit for recovering the oil from the treated biomass.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates, in part, to a method for bio-oil recovery from a fermentation process, comprising adding at least one separation aid to stillage that contains oil, to form a treated stillage prior to centrifuging the stillage, and centrifuging the treated stillage in at least one centrifuge to separate at least a portion of the oil from the treated stillage. The separation aid comprises at least one lecithin and at least one oil and optionally at least one surfactant having an HLB value of at least 6.

The present invention also relates to a separation aid composition comprising a) from 20 wt % to 50 wt % of at least one lecithin; b) from 20 wt % to 50 wt % of at least one oil; and c) from 0 wt % to 20 wt % of at least one surfactant having an HLB values of at least 9.

The present invention also relates to a treated stillage comprising the separation aid composition and stillage wherein the separation aid is present in an amount of at least 50 ppm.

The present invention also relates to a method for oil recovery from algae, comprising adding the indicated at least one separation aid to algae that contains oil, to form a treated algae prior to centrifuging the algae, and centrifuging the treated algae in at least one centrifuge to separate at least a portion of the oil from the treated algae.

The present invention also relates to a bio-oil recovery system, comprising a supply of biomass that comprises stillage or algae; a supply of the indicated separation aid; a treatment unit for combining the separation aid with the biomass to form treated biomass; and a centrifuge for dewatering the treated biomass to produce concentrated bio-oil.

As used herein, "bio-oil" refers to food-grade and non-food grade oils and fats that are derived from plants and/or animals (e.g., vegetable oils and animal fats), which contain primarily triglycerides, but can also contain fatty acids, diglycerides and monoglycerides. As used herein, the term "fat" is understood to include "lipids". Examples of bio-oils derived from plants include, but are not limited to, corn oil, sugarcane oil, sunflower oil, flaxseed oil, canola oil, and the like. Other bio-oils include algaculture bio-oils (from algae).

As used herein, "biofuel" refers to any renewable solid, liquid or gaseous fuel produced biologically, such as bio-oils, including for example, bio-oils derived from biomass. Biofuels also include, but are not limited to, biodiesels, bioethanol (i.e., ethanol), biogasoline, biomethanol, biobutanol, and the like.

As used herein, "biomass" refers generally to organic matter harvested or collected from a renewable biological resource as a source of energy. The renewable biological resource can include plant materials (e.g., plant biomass), animal materials, and/or materials produced biologically. The term "biomass" is not considered to include non-renewable fossil fuels, such as coal, petroleum and natural gas, which do not normally include glycerides (e.g., tri-, di-, mono-).

As used herein, "stillage" refers to a co-product or byproduct produced during production of a biofuel. When used without qualification, the term "stillage" can refer to whole stillage, thin stillage, or concentrated stillage such as condensed distillers soluble, i.e., syrup, which can be produced from biofuel process streams, e.g., bioethanol production process streams. The differences between these different forms of stillage can be further understood with reference to the examples thereof that are provided in FIG. 1 herein.

As used herein, a "centrifuge" is a piece of equipment, generally driven by a motor, that can put a mixture, blend or slurry in rotation around a fixed axis, applying a force perpendicular to the axis. Centripetal acceleration generated in the centrifuge causes denser and lighter substances of the mixture, blend or slurry to separate out. Centrifuges can be oriented horizontally, vertically, or other orientations.

As used herein, an "evaporator" is a device used to evaporate or vaporize the liquid form of a chemical or chemicals in a mixture, blend or slurry into gaseous or vapor form. The evaporation of more volatile components of a mixture, blend or slurry in an evaporator can concentrate the remaining less volatile liquid components in the device.

As used herein, "surfactant" refers to a compound that can lower the surface tension of a liquid, the interfacial tension between two liquids, or that between a liquid and a solid.

As used herein, a "nonionic surfactant" is an organic compound that is amphiphilic and has no charge group at either terminal end group thereof, wherein the organic compound can lower the surface tension of a liquid, the interfacial tension between two liquids, or that between a liquid and a solid.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

The present invention provides a method for bio-oil recovery wherein oil-containing biomass is treated with a separation aid that permits recovery of bio-oil from the feedstock by separation processing, such as centrifugation. The separation aid can increase separation between oil and non-oil components of the biomass wherein the oil can be recovered in high concentration fractions from the biomass by simple separation processes. The separation aid also can increase clarity in the recoverable oil provided in the treated biomass. Further, the separation of the oil from biomass can be obtained at relatively lower dosage levels than some comparative treatment products, such as shown in the examples described herein.

In general, the present invention relates to a method for bio-oil recovery from a fermentation process. The method can include, comprise, consists essentially of, or consists of: adding at least one separation aid to stillage that contains oil, to form a treated stillage prior to centrifuging the stillage. The method further includes centrifuging the treated stillage in at least one centrifuge (e.g., one, two, or three or more) to separate at least a portion of the oil (e.g., separate at least 0.1 wt % to 100 wt % of available oil present in treated stillage based on the weight of oil present in treated stillage) from the treated stillage. The separation aid can comprise, consists essentially of, include, or consists of at least one lecithin and at least one oil and optionally at least one surfactant having an HLB value of at least 6.

In the method of the present invention, the separation aid can be added before and/or in at least one evaporator located upstream from the centrifuging.

In the present invention, the fermentation process can comprise, consists essentially of, include or consists of a series of evaporators that the stillage can enter sequentially and located upstream from the centrifuging. The adding of the separation aid can occur just prior to or in at least one of the evaporators located closer to the centrifuge. The method can involve a series of evaporators that can include from 1 to 8 or more evaporators, such as at least 8 evaporators, wherein the adding of the separation aid occurs just prior to or in the $5^{th}$, $6^{th}$, $7^{th}$, and/or $8^{th}$ evaporator.

The separation aid of the present invention can be a composition which comprises lecithin and an oil. The composition optionally can further include at least one surfactant having an HLB value of at least 6. These compounds can meet required criteria for animal feed regulations, as well as have higher boiling points compared to previous extraction components indicated herein but without their drawbacks. For example, the separation aid can comprise lecithin and mineral oil components, which are listed as GRAS approved products and individually are commonly found in many food applications. As some of its advantages, the separation aid can comprise higher boiling point components, GRAS approved starting materials, can be used at lower dosage requirements with improved oil separation and/or oil clarity, and/or with decreased centrifuge fouling and improved post separation. The separation aid can function like an oil breaking additive to reduce emulsification or tendencies thereof in stillage and other biomass, and/or increase oil and aqueous phase separability and/or separation in the treated biomass.

In an example, the separation aid for bio-oil recovery, such as for treatment of a vegetable oil resulting from a biomass fermentation process or algae oil resulting from algaculture, can comprise a lecithin, a hydrocarbon oil, and optionally a surfactant with an HLB of at least 9. For example, the lecithin can be a modified lecithin, the hydrocarbon oil can be based on mineral seal oil, and the surfactant, if included, can be a nonionic surfactant based on ethoxylated sugar alcohol ester or triglycerides. When these lecithin, oil, and optional surfactant components are used in combination in treating a biomass, the resulting product aids in oil separation and clarity at low dosage levels. The separation aid can be particularly effective in promoting oil separation in a biomass treated with the composition after a biomass fermentation process. Although the separation aid is used advantageously in bio-oil recovery, it may be used for many purposes and functions, such as a defoamer, oil separation aid, fermentation aid, demulsifier, and/or oil breaking aid.

The indicated separation aid can be used, for example, in a method of recovering oil from a stillage byproduct resulting from the production of ethanol from corn, such as by using a dry milling technique, such as described in U.S. Pat. No. 5,250,182, which is incorporated herein in its entirety by reference. The stillage byproduct can be whole stillage, thin stillage, or syrup from the evaporator. As generally known, thin stillage is recovered by separating the distillers wet grain from the "whole stillage" leftover after fermentation is complete. As also generally known in the art, this mechanical separation may be accomplished using a press/extruder, a decanter centrifuge (also simply known as a "decanter"), or a screen centrifuge. Moisture is then removed from the unfiltered thin stillage to create a concentrate or syrup, such as through evaporation. The separation aid of the present invention makes it possible to easily recover usable oil from the whole stillage, thin stillage, syrup (concentrate), or any combinations thereof, without the need to pressure cook the stillage or use multiple stages of filtration that may be expensive and complicated forms of processing.

Figure 1:
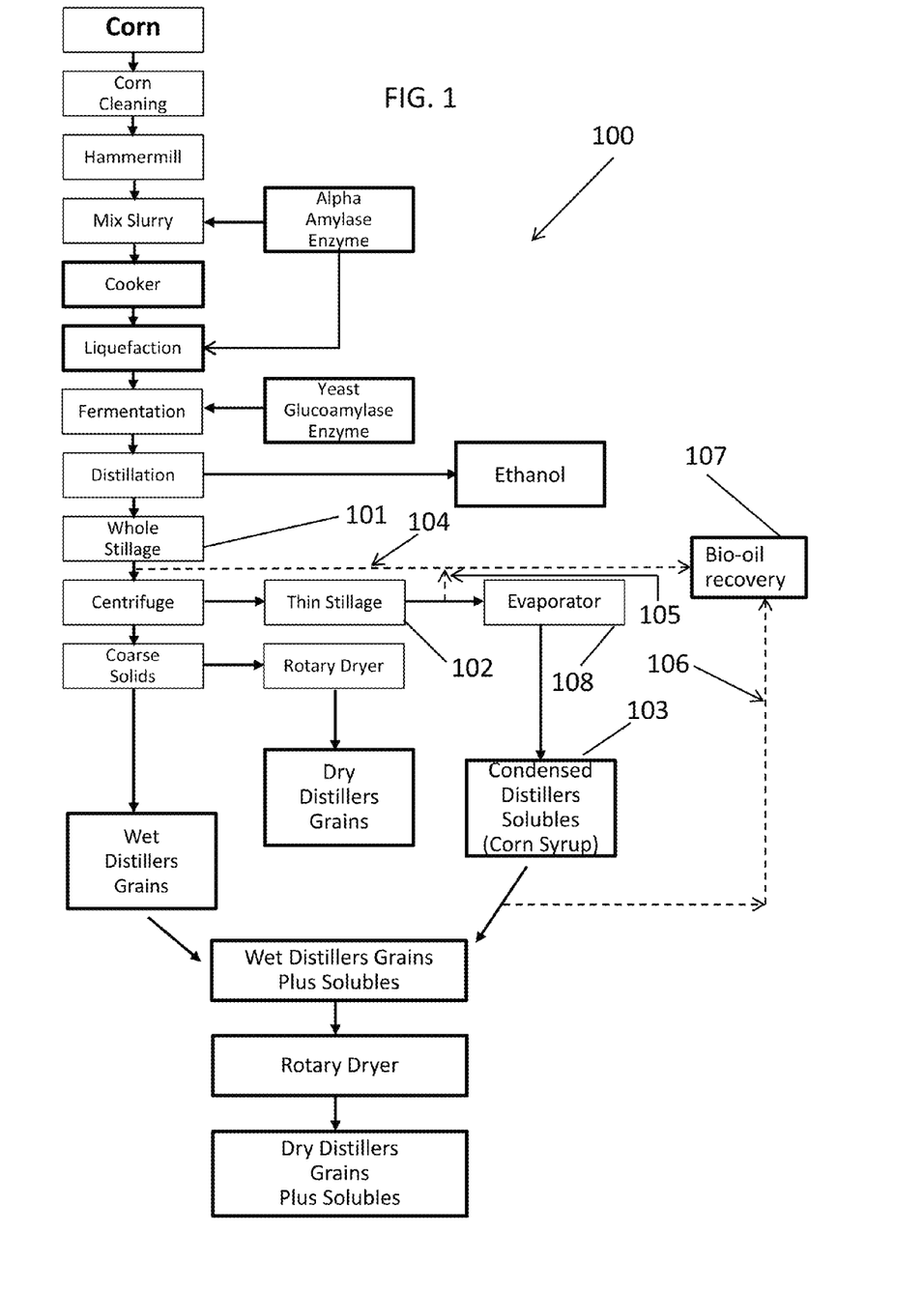
FIG. 1 is a process flow diagram of ethanol biofuel and byproducts production from corn (or other fermentable starch-containing biomass) that includes bio-oil recovery from stillage treated with a separation aid in accordance with an example of the present application.

Referring to FIG. 1, a process 100 for the production of ethanol biofuel and byproducts from corn includes bio-oil recovery 107 from stillage treated with separation aid. Several process byproducts 101, 102, 103 are identified in this figure for purposes of exemplifying various types of "stillage" that may be used at least in part in at least one, two, or all three process streams 104, 105, and 106, respectively, for use as feedstock in bio-oil recovery 107. As indicated in FIG. 1, following distillation, the whole stillage is separated by centrifuge, such as a decanter centrifuge, into wet grains and thin stillage. Evaporator 108 can concentrate thin stillage into syrup by evaporation, and the syrup can be combined with wet grains to produce distiller grains and solubles (DGS), or can be dried to produce distiller dried grains and solubles (DDGS), or both. The bio-oil recovery 107 can be implemented as a subsystem or as integrated into the primary process line shown in the figure. The bio-oil recovery, for example, can be a part of the process wherein stillage is diverted or withdrawn from the main process line to be treated with a separation aid in combination with an evaporator and a centrifuge on a subsystem that is different from the main system line shown in FIG. 1 that includes evaporator 108. The bio-oil recovery 107, alternatively, can be integrated more directly into the main process line. For example, a treatment of the thin stillage with the separation aid can occur in combination with evaporation performed in the evaporator 108 of the main process line and together with an added centrifuge used to recover the oil (shown in other figures herein). In this example, evaporator 108 of the main process line and the indicated added centrifuge are used in the bio-oil recovery subsystem. Corn is shown as the biomass material in FIG. 1 for sake of illustration, and other biomass materials can be used, such as other fermentable starch-containing biomass materials.

Figure 2:
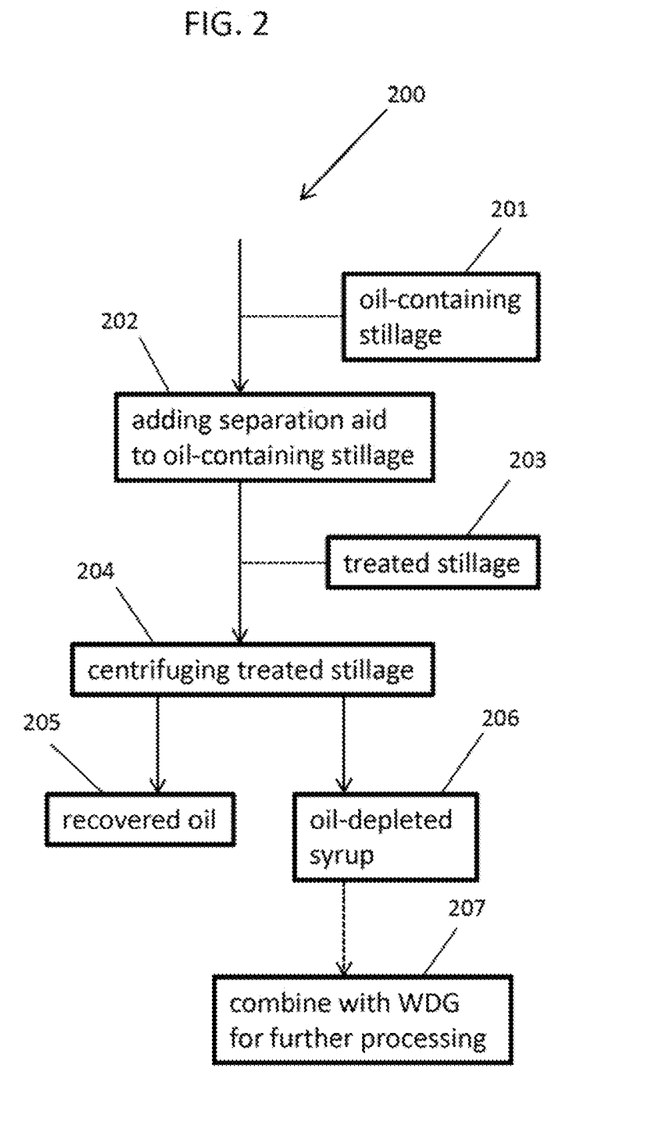
FIG. 2 is a process flow diagram showing a method for bio-oil recovery from stillage treated with a separation aid according to an example of the present application.

Referring to FIG. 2, a method of bio-oil recovery as applied to oil-containing stillage is shown. Stillage 201 is shown that is fed to bio-oil recovery 200 (which can be the same as 107 shown in FIG. 1), where the stillage is treated with a separation aid 202, which can have a composition described herein. The resulting treated stillage 203 is centrifuged 204 to provide an oil-concentrated product 205 and an oil-depleted syrup 206. The oil-depleted syrup 206 optionally can be combined in step 207 with wet distillers grains (WDG) for further processing, such as the WDG shown in the process flow of FIG. 1.

Figure 3:
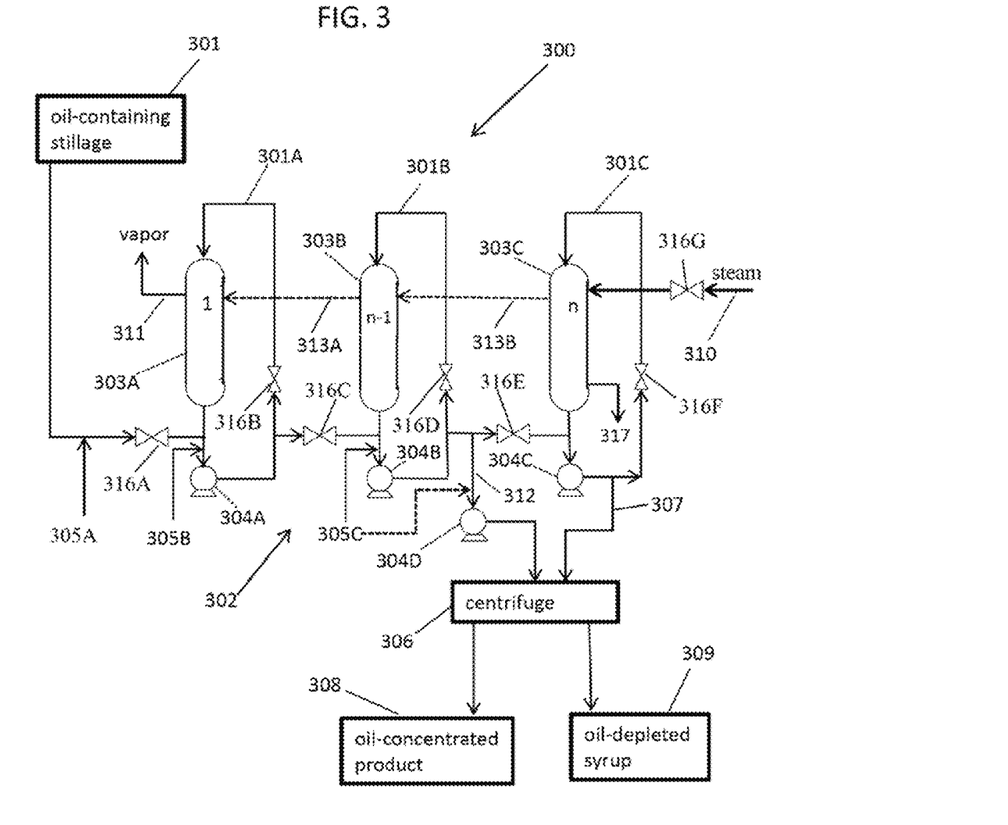
FIG. 3 shows a subsystem comprising a multistage evaporator and centrifuge configuration for use in bio-oil recovery from stillage treated with a separation aid according to an example of the present application.

Referring to FIG. 3, a subsystem 300 for bio-oil recovery comprises a multistage evaporator 302 and centrifuge 306 for use in the recovery of bio-oil 308 from oil-containing stillage 301 as feedstock. The multi-stage evaporator 302, for example, can be a series arrangement of a plurality of evaporators that can remove water and/or other volatiles from the stillage to concentrate the thin stillage and increase its solids content. The multistage evaporator 302 can be, for example, a multi-stage flash evaporator, which can have equipment designs generally known in the bioethanol production industry. Falling film, or forced circulation, or multiple-effect evaporators, or other types of evaporators, can be used for the concentration of stillage in this respect. The feedstock 301, for example, can be any of the stillage sources indicated with respect to FIG. 1. In an example where thin stillage is the feedstock, initial processing of whole stillage produced as a byproduct of corn fermentation and distillation can be done in a conventional fashion, such as using a centrifugal decanter (not shown), and the mechanically separated thin stillage can be delivered to the multi-stage evaporator 302 forming part of the subsystem 300. To increase efficiency, the temperature difference between the heating and the heated media can be reduced using such multiple-stage evaporators. In FIG. 3, steam 310 is fed into at least one of the individual evaporators 303A, 303B and 303C of the multi-stage evaporator 302, and volatiles 313B and 313A are discharged as overheads from the succession of evaporators and can be used in a succeeding evaporator to heat the stillage in that unit. As shown in FIG. 3, live steam can be introduced to evaporator 303C through valve 316G. For example, steam can be introduced on a steam side (non-product side) of a heat exchange design of evaporator 303C, and volatiles 313B of the heated stillage can be discharged from the stillage side of evaporator 303B. Condensed heating steam 317 can be withdrawn from evaporator 303C. The stillage volatiles 313B produced in evaporator 303C can be fed to a steam side of a heat exchange design of a succeeding evaporator 303B and used to heat stillage in that unit. In turn, volatiles 313A discharged from the stillage side of evaporator 303B can be fed to a steam side of a heat exchange design of another evaporator 303A and used to heat stillage in that unit. A vapor/volatiles stream 311 can be discharged from the stillage side of evaporator 303A. Live steam also may be used at least in part to heat stillage in a plurality or all of the evaporators. Pumps can be used between the evaporators in the multi-stage evaporation process to conduct non-volatized oil-containing liquids ("bottoms") successively from one evaporator to the next evaporator in the process flow of the multi-stage evaporator unit.

The multi-stage evaporator 302 used in FIG. 3, for example, can have a plurality of stages (i.e., "n" stages, where n≥2). The number of stages "n" can be, for example, 2 or more stages, or 5 or more stages, or 8 or more stages, or from 2 to 8 stages, or from 2 to 9 stages, or from 2 to 10 stages, or other numbers, arranged in series. The evaporator 302, for example, can have 8 stages with 7 intervening pumps used to pump stillage from the first evaporator or stage 1 to stage 2, from stage 2 to stage 3, from stage 3 to stage 4, from stage 4 to stage 5, from stage 5 to stage 6, from stage 6 to stage 7, and from stage 7 to stage 8. An additional pump, e.g., an eighth pump, can be used to pump the bottoms from the final evaporator. The oil content of the stillage bottoms in the evaporator can become progressively larger and the aqueous and volatile organic solubles content progressively smaller, as the stillage advances through the succession of stages of evaporators. For example, FIG. 3 shows a multistage evaporator 302 with n stages of evaporators including the evaporators 303A, 303B and 303C. Valves 316A-F can be used to control flow of liquid stillage through the evaporator system 302. Pump 304A pumps bottoms from the first evaporator 303A to a succeeding evaporator, such as evaporator 303B or other intervening evaporator (not shown). Pump 304A also can be used for recirculation of bottoms of evaporator 303A back into that evaporator. Pump 304B pumps bottom from the evaporator 303B to evaporator 303C. Pump 304B also can be used for recirculation of bottoms back into evaporator 303B. Pump 304C can be used for recirculation of bottoms of evaporator 303C backing into that evaporator and/or can pump bottoms 307 from the final evaporator 303C to the centrifuge 306. A separate oil skid supply pump 304D can pull from the suction of a chosen evaporator, such as evaporator 303B, and the pump 304D can supply the stillage/syrup 312 from the chosen evaporator to the oil centrifuge 306. Evaporator 303B is shown as chosen for this purpose in the illustration of FIG. 3, but another evaporator such as 303A, 303C, and so forth could be chosen, As indicated, additional evaporators and pumps can be installed and used between the first evaporator 303A and its discharge pump 304A and evaporator 303B and its discharge pump 304B. The feedstocks 301A, 301B, and 301C to the respective different evaporators 303A, 303B, and 303C are shown. As indicated in FIG. 3, valving can be included to optionally recycle some or none of the bottoms from a respective evaporator back into the same evaporator. Separation aid 305A can be added to the stillage feedstock 301, or separation aid 305B can be added at pump 304A, or separation aid 305C can be added at pump 304B or at pump 304D, or separation aid can be added to bottoms fed by pumps from any other evaporator to the next in the series of evaporators, or any combinations of these addition points of the separation aid may be used. The separation aid also may be directly introduced into an evaporator and/or via a side stream (not shown).

In a process flow through a bio-oil recovery subsystem, the stillage can have a solids content, for example, of below 30 wt %, or from about 5 wt % to about 20 wt %, or from about 7 wt % to about 18 wt %, or other values (based on the weight of the stillage), when the separation aid is added to the stillage before or in the multi-stage evaporator. As indicated, the separation aid can be mixed with stillage before introduction to the evaporator, or added to the stillage at or between the evaporators of the multi-stage evaporator, or any combinations of these. The separation aid can be added predominantly during one or more intermediate stages of a multi-stage evaporator. The separation aid can be introduced, for example, in an 8 stage multi-stage evaporator at any of pumps 5 to 8, or directly into any of evaporators 5 to 8, or any combinations thereof. The pumps can provide convenient introduction points for the separation aid. As indicated, pumps 1-7 are pumps between succeeding evaporators in an 8 stage evaporator series and the 8th pump is used to pump bottoms from the final evaporator to the centrifuge. For instance, in FIG. 3, the concentrate or syrup 307 discharged from the final evaporator 303C is pumped to centrifuge 306 for separation processing to recover the oil. The concentrate or syrup is separated by the centrifuge 306 into oil-concentrated product 308 and an oil-depleted syrup 309. Centrifugation separates the oil from non-oil liquids for oil capture. The solids content of the oil-concentrated product can be, for example, at least about 95 wt %, or at least about 96 wt %, or at least about 97 wt %, or at least about 98 wt %, or at least about 99 wt %, or from about 95 wt % to 100 wt %, or from about 98 wt % to about 99.5 wt %, or other values, based on the weight of the product. These amounts can be represented entirely (100%) by oil solids, or lesser amounts including the same indicated numerical ranges given for the solids content in general. The balance of the oil-concentrated product may be water, non-oil organic compounds, or both. The solids content of the oil depleted-syrup may be, for example, from about 4 to about 8 wt %, or about 6 wt %, or other values. The centrifuge 306 can be, for example a decanter centrifuge, a horizontal centrifugal solid bowl decanter, a disk stack centrifuge, a hermetically sealed centrifuge, or other type of centrifuge or gravity separator. As indicated in FIG. 2, the oil-depleted syrup 309 discharged from the centrifuge may be combined with wet distillers grains in further processing.

Figure 4:
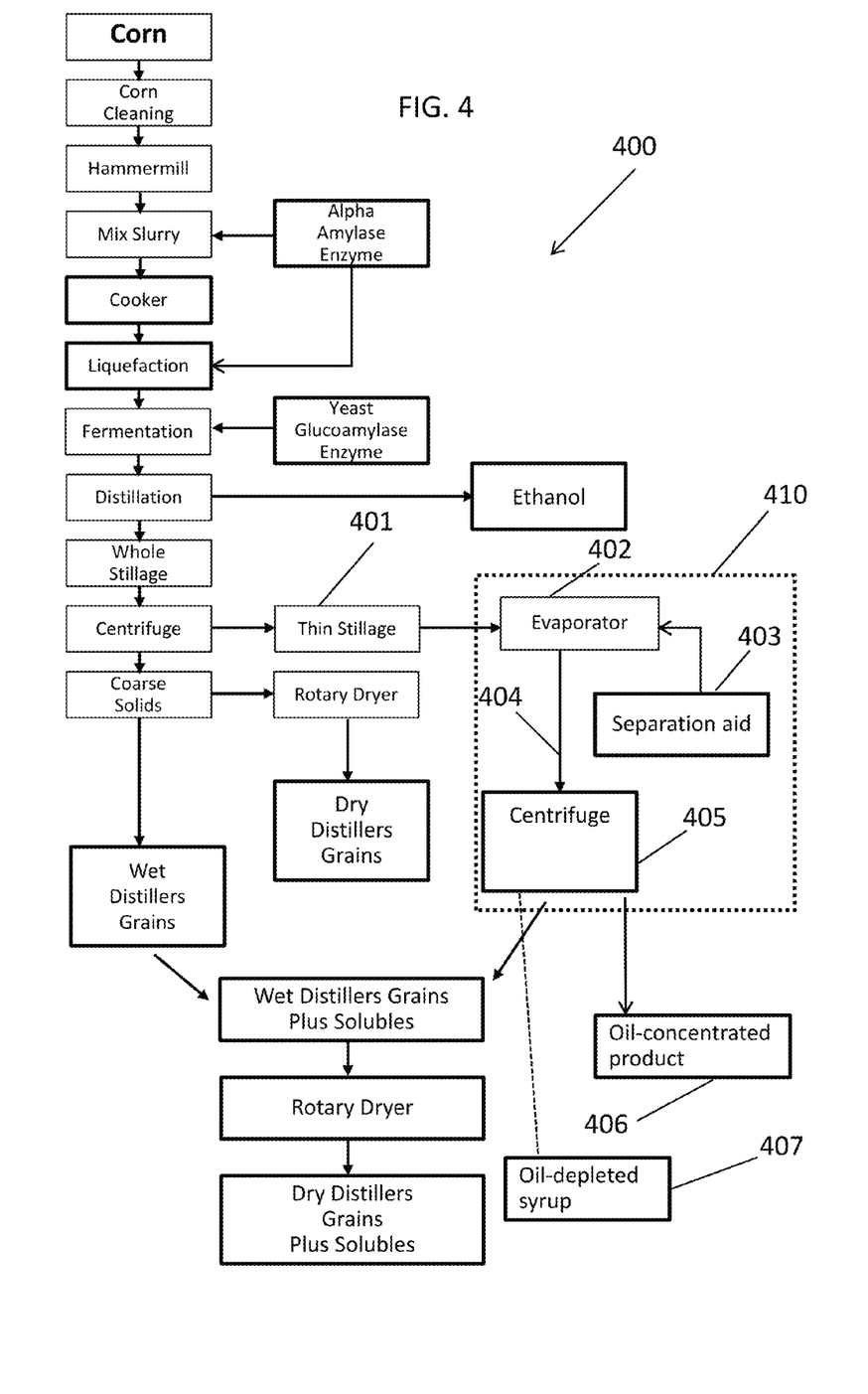
FIG. 4 is a process flow diagram of ethanol biofuel and byproducts production from corn (or other fermentable biomass) that includes bio-oil recovery from stillage treated with a separation aid in accordance with an example of the present application.

Referring to FIG. 4, bio-oil recovery is shown as performed in a subsystem 410 that is integrated into a main process line of a bioethanol production facility. The ethanol biofuel and byproducts production from corn includes bio-oil recovery from thin stillage 401 that has been treated with separation aid 403 at an evaporator 402 (such as shown in FIG. 3), and then oil 406 is separated out of the syrup product 404 of the evaporator 402 with a centrifuge 405. The evaporator 402 can be a multistage unit, such as an 8 stage evaporator, arranged to concentrate thin stillage 401 into syrup 404 via evaporation before blending this syrup 404 with the wet grains prior to thermal drying. A multistage evaporator 402 can have the design such as shown for evaporator 302 in FIG. 3. The subsystem 410 incorporates the centrifuge 405 into the process flow to separate out the oil 406 from the syrup product 404 discharged from the evaporator 402. As also indicated in FIG. 4, the oil-depleted syrup 407 discharged from the centrifuge 405 can be combined with wet distillers grains and dried in the production of DDGS.

The separation aid can comprise, for example, a) 30 wt % to 70 wt % of lecithin; b) 30 wt % to 70 wt % of oil; and c) 0 wt % to 40 wt % of surfactant. All weight percentages given for the components of the separation aid shown herein are based on total weight of the composition. The separation aid can comprise a) 30 wt % to 50 wt % of said lecithin; b) 20 wt % to 50 wt % of said oil; c) 0 wt % to 20 wt % of said surfactant. The separation aid can comprise a) 30 wt % to 50 wt % of said lecithin; b) 20 wt % to 50 wt % of said oil; c) 1 wt % to 20 wt % of said surfactant. The separation aid can comprise a) 30 wt % to 50 wt % of said lecithin; b) 20 wt % to 50 wt % of said oil; c) 3 wt % to 15 wt % of said surfactant. The lecithin and the oil can be present in a lecithin:oil weight/weight ratio of from 0.8:1 to 1:0.8, or from 0.85:1 to 1:0.85, or from 0.9:1 to 1:0.9, or 1:1, or other values. The separation aid can be effective in providing highly quality oil at low dosage levels. The separation aid can be added to biomass being treated in an amount to be present in a ppm range, for example, of from about 200 ppm to about 800 ppm, or from about 250 ppm to about 750 ppm, or from about 300 ppm to about 700 ppm, or from about 350 ppm to about 650 ppm, or other from about 400 ppm to about 600 ppm, or other values above, within, and below the ranges provided. The ppm values indicated herein are based on weight/weight values.

The separation aid can be used substantially neat, for example, comprising less than 1 wt % water, or less than 0.5 wt % water, or less than 0.1 wt % water, or less than 500 ppm water, or less than 100 ppm water, or 0 wt % water. The separation aid can be formulated as very low in aromatic content or aromatic free. The separation aid can be formulated, for example, as comprising less than 1 wt % aromatic compounds, or less than 0.5 wt % aromatics, or less than 0.1 wt % aromatics, or 0 wt % aromatics. The separation aid can be formulated as being very low in alcohols content or alcohol free. The separation aid can be formulated, for example, as comprising less than 1 wt % alcohol, or less than 0.5 wt % alcohol, or less than 0.1 wt % alcohol, or 0 wt % alcohol. The separation aid can be a food-grade or GRAS approved composition or mixture.

The processes for recovery of bio-oil of the present invention can be applied to other types of biomass in addition to grains such as corn. For example, the processed can be applied to recovery of bio-oil from algae. Processes for producing biofuels from algae include, for example, those which pump nutrient-rich water through plastic or borosilicate glass tubes (called "bioreactors") that are exposed to sunlight (and so called photobioreactors or PBR). Algae farms can also be set up on marginal lands, such as in desert areas where the groundwater is saline, rather than utilize fresh water. They can also be grown on the surface of the ocean. Because algae strains with lower lipid content may grow as much as thirty times faster than those with high lipid content, efficient biodiesel production from algae can depend in finding an algal strain with a combination of high lipid content and fast growth rate, which is not too difficult to harvest and a cost-effective cultivation system (i.e., type of photobioreactor) that is best suited to that strain. Concentrated $CO_2$ is used to increase the rate of production. The lipid, or oily part of the algae biomass can then be extracted. In examples of the present invention, the bio-oil removal is enhanced by treating the algae biomass with the indicated separation aid composition, before centrifuging the treated algae biomass. The oil concentrated product or fraction discharged from the centrifuge can be used as in biofuel or other purposes. After oil is separated from the algae, the algae residue can be used, such as an animal feedstock or as a soil fertilizer.

Figure 5:
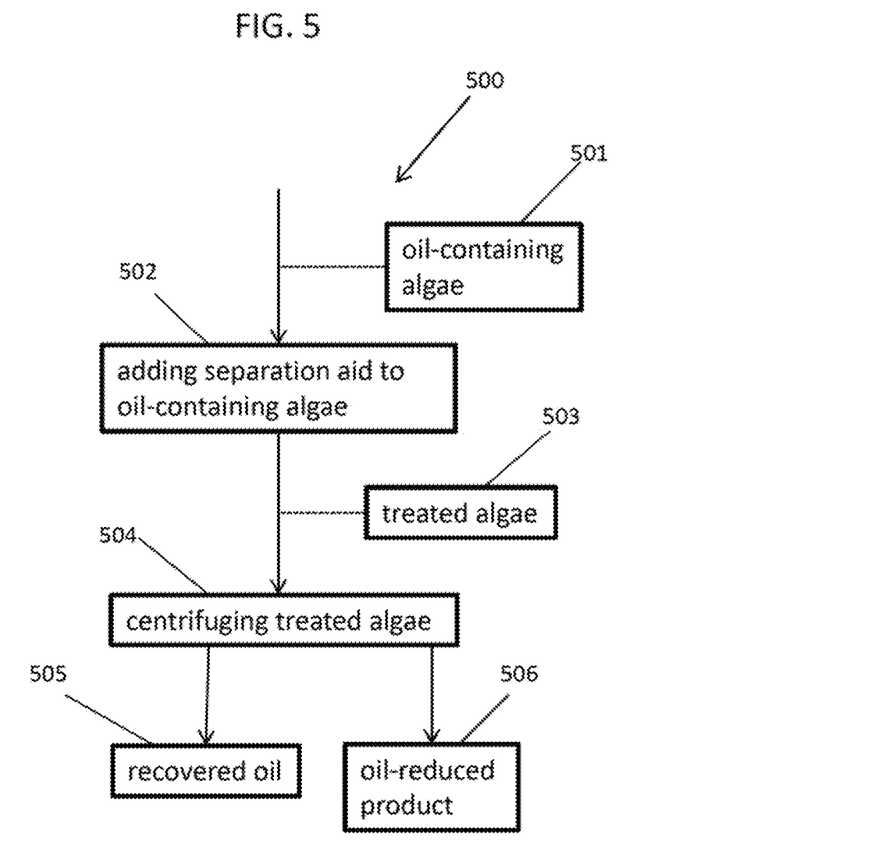
FIG. 5 is a process flow diagram showing a method for bio-oil recovery from oil-containing algae treated with a separation aid according to an example of the present application.

Referring to FIG. 5, bio-oil recovery is applied to recovery of bio-oil from algae as the biomass. Oil-containing algae 501 is used as feedstock to the bio-oil recovery 500 process flow shown in FIG. 5. The oil-containing feedstock is treated with a separation aid 502, and the resulting treated algae 503 is centrifuged 504, to provide an oil-concentrated product 505 and an oil-depleted product 506.

The lecithin used in the separation aid can be natural origin, modified origin, or synthetic. The lecithin which can be used in the present invention can be lecithin derived from any plant, animal or microbial source. Suitable lecithin starting materials are commercially available, and include available soybean lecithin and yolk lecithin products. Lecithin can be obtained from natural sources such as egg yolk, and plants such as soybean, maize, rapeseed, and the like where it is a by-product of vegetable oil refinement. Soybean oil is the largest source of commercial lecithin. The composition of commercial lecithin depends on the source, methods of preparation, and degree of purification, but in the most pure form it is comprised of mainly phosphatides. Commercial lecithin, for example, is a co-product of oil processing obtained during degumming step. For example, soybean lecithin is a complex mixture and comprises of phospholipids and triglycerides, with minor amounts of other constituents like phytoglycolipids, phytosterols, tocopherols and fatty acids. The major phospholipids present in vegetable lecithins are phosphatidylcholine, phosphatidylethanolamine and phosphatidylinositol. The egg yolk lecithin contains phosphatidylcholine and phosphatidylethanolamine as major phospholipids. Lecithin can be extracted chemically (using hexane) or mechanically from readily available sources such as soy beans. Lecithin has low solubility in water. In aqueous solution, its phospholipids can form either liposomes, bilayer sheets, micelles, or lamellar structures, depending on hydration and temperature. This results in a type of material that is usually classified as amphipathic. As used herein, "modified lecithin" refers to, but is not limited to, acetylation, hydroxylation, hydrogenation, hydrolysis products of lecithin, chlorination, bromination, iodination, halogenation, phosphorylation and sulfonation, as well as any other modification known to those in the art. Acetylated lecithins can be produced, for example, using a carboxylic acid anhydride like acetic anhydride for the acetylation of phospholipids from vegetable lecithins, such as shown in U.S. Pat. No. 3,301,881, which is incorporated herein by reference in its entirety. An enzymatic process can be used for the preparation of an acetylated phospholipid from vegetable lecithins such as soybean lecithin, rapeseed lecithin, and animal lecithins like egg yolk lecithin or pure phosphatidylethanolamine isolated from the above lecithins. Commercial lecithins can be acetylated, for example, by using vinyl acetate as acylating agent in presence of lipase from *Mucor miehei* having 1,3-position specificity as catalyst, such as shown in U.S. Pat. No. 6,403,344, which is incorporated herein by reference in its entirety.

In acetylated lecithin, for example, acetylation occurs primarily on the amino group of phosphatidylethanolamine. The extent of acetylation on the modified lecithin, if used, can be partial or complete. The extent of acetylation on a modified lecithin can be, for example, from about 5% to 100%, or from about 10% to about 99%, or from about 15% to about 95%, or from about 20% to about 90%, or from about 25% to about 75%, or other values. Lecithin additionally contains a number of chemical functional groups that make it susceptible to a variety of chemical reactions. These groups include carbon-carbon double bonds, esters, phosphonate esters, amines and hydroxyl groups. Modification may also result in interesterified lecithin. Additionally, lecithins may be enzyme modified. As used herein, "phosphatides" (Phospholipids) refers to, but are not limited to, mixtures of phosphatidyl choline, phosphatidyl ethanolamine, phosphatidyl serine, phosphatidyl inositol, phosphatidic acid, N-acylphosphatidyl ethanolamine and other related minor constituents. Commercial sources of lecithin or modified lecithin which can be used in separation aids of the present invention include, for example, Solec HR 2B from Solae LLC (Memphis, Tenn. USA).

The oil included in the indicated separation aid can be, for example, mineral oil, triglyceride vegetable oil, hydrocarbon oil, or any combination thereof. The mineral oil can be, for example, white mineral oil or mineral seal oil. Examples of the mineral oil can be the atmospheric residue oil obtained in the distillation of crude oil, vacuum gas oil, and vacuum residue oil obtained by vacuum distillation of the atmospheric residue oil, their hydrotreated oils, pyrolysis oils, and or their mixtures. Among these mineral oils, the atmospheric residue oil, vacuum residue oil, and their hydrotreated products or pyrolysis products are referred to as residue oils in the present invention. The triglyceride vegetable oil can be, for example, triglyceride corn oil. The hydrocarbon oil can be, for example, white mineral oil, or any combinations thereof. Commercial sources of the oil which can be used in separation aids of the present invention include, for example, Clarion White Mineral Oil 70, CITGO Petroleum (Houston, USA).

The surfactants optionally included in the indicated separation aid composition can be, for example, nonionic surfactants, cationic surfactants, or anionic surfactants. The surfactant (which can be one or more) can be a nonionic surfactant, for example, ethoxylated castor oil, an ethoxylated sorbitan ester, a PEG, a poloxamer, an acetylenic glycol, or a sulfonate, or combinations thereof. The nonionic surfactants can be, for example, nonionic polyethylene glycols, such as ethoxylate of carboxylic acids, ethoxylate of mono-, di- or triglycerides, ethoxylate of mono-, di- or triesters of sorbitan or ethoxylate of fatty alcohols. The ethoxylated sorbitan esters can be commercially obtained as TWEEN or polysorbate series surfactant. Other suitable nonionic surfactants are mono-, di- or triglycerides based on fatty acids having 12-22 carbon atoms, or mono-, di- or triesters of sorbitan based on fatty acids having 12-22 carbon atoms. Commercial sources of the nonionic surfactant which can be used in separation aids of the present invention include, for example, Lumisorb Polysorbates from Lambent Technologies Corporation (Gurnee, Ill. USA). The nonionic surfactant may be at least one poloxamer. Poloxamers can be nonionic triblock copolymers that comprise a central block of a hydrophobic polyalkyleneoxide block, which is flanked on both sides with hydrophilic polyalkyleneoxide blocks. Poloxamers are commercially available that are food grade. A commercial source of poloxamers are, for example, PLURONIC® copolymers from BASF Corporation (Florham Park, N.J., U.S.A.).

The water solubility of the surfactants, such as the nonionic surfactants, can be related to their hydrophilic-lipophilic balance (HLB) value or number. The nonionic surfactants can have an HLB value of at least about 6, or at least about 9, or at least about 12, or from about 6 to 20, or from about 7 to about 19, or from about 8 to about 18, or from about 9 to about 17, or from about 10 to about 16, or other values. The water solubility of nonionic surfactants can be related to their hydrophilic-lipophilic balance (HLB) value or number. The HLB value can be calculated in a conventional manner. For example, the HLB value of a nonionic surfactant can be calculated by dividing the molecular weight percent of the hydrophilic portion of the nonionic surfactant by five. For example, a nonionic surfactant containing 80 mole % hydrophilic portion (total) would have an HLB value calculated to be 16 (i.e., 80/5=16). HLB values that exceed 20 are relative or comparative values.

The separation aid composition can contain additional optional additives. For example, the separation aid can contain silica, such as fumed silica. The fumed silica can be hydrophobic or hydrophilic. Fumed silica is food grade and can be more desirable for this reason. If used, fumed silica can be contained in the separation aid in an amount, for example, of from about 1 wt % to 10 wt %.

The present invention includes the following aspects/embodiments/features in any order and/or in any combination:

1. A method for bio-oil recovery from a fermentation process, comprising
   adding at least one separation aid to stillage that contains oil, to form a treated stillage prior to centrifuging said stillage and
   centrifuging said treated stillage in at least one centrifuge to separate at least a portion of said oil from said treated stillage, wherein said separation aid comprises at least one lecithin and at least one oil and optionally at least one surfactant having an HLB value of at least 6.
2. The method of any preceding or following embodiment/feature/aspect, wherein said adding occurs in at least one evaporator located upstream from said centrifuging.
3. The method of any preceding or following embodiment/feature/aspect, wherein said fermentation process comprises a series of evaporators that said stillage enters sequentially and located upstream for said centrifuging, and wherein said adding of said at least one separation aid occurs just prior to or in at least one of said evaporators located closer to said centrifuge.
4. The method of any preceding or following embodiment/feature/aspect, wherein said series of evaporators comprise at least 8 evaporators and said adding occurs just prior to or in the $5^{th}$, $6^{th}$, $7^{th}$, or $8^{th}$ evaporator.
5. The method of any preceding or following embodiment/feature/aspect, wherein said at least one surfactant is present.
6. The method of any preceding or following embodiment/feature/aspect, wherein said separation aid comprises:
   a) 30 wt % to 70 wt % of said lecithin;
   b) 30 wt % to 70 wt % of said oil;
   c) 0 wt % to 40 wt % of said surfactant.
7. The method of any preceding or following embodiment/feature/aspect, wherein said separation aid comprises less than 1 wt % water.
8. The method of any preceding or following embodiment/feature/aspect, wherein said separation aid comprises less than 1 wt % aromatic compounds.
9. The method of any preceding or following embodiment/feature/aspect, wherein said separation aid comprises less than 1 wt % alcohol compounds.

10. The method of any preceding or following embodiment/feature/aspect, wherein said separation aid is a food-grade or GRAS approved composition or mixture.
11. The method of any preceding or following embodiment/feature/aspect, wherein said lecithin and said oil are present in a lecithin:oil weight ratio of from 0.8:1 to 1:0.8.
12. The method of any preceding or following embodiment/feature/aspect, wherein said separation aid is added in an amount to be present in a ppm range of from about 200 ppm to 800 ppm.
13. The method of any preceding or following embodiment/feature/aspect, wherein said oil is mineral oil, vegetable oil, or any combination thereof.
14. The method of any preceding or following embodiment/feature/aspect, wherein said oil is a triglyceride oil or hydrocarbon based oil.
15. The method of any preceding or following embodiment/feature/aspect, wherein said lecithin is an acetylated lecithin.
16. The method of any preceding or following embodiment/feature/aspect, wherein said lecithin is soy lecithin or soy bean lecithin.
17. The method of any preceding or following embodiment/feature/aspect, wherein said surfactant is at least one ethoxylated castor oil or PEG surfactant or sulfonate or acetylenic glycol.
18. The method of any preceding or following embodiment/feature/aspect, wherein said surfactant is a non-ionic surfactant.
19. The method of any preceding or following embodiment/feature/aspect, wherein said surfactant is a cationic or anionic surfactant.
20. The method of any preceding or following embodiment/feature/aspect, wherein said surfactant has a HLB value of from 9 to 20.
21. The method of any preceding or following embodiment/feature/aspect, wherein said separation aid is added to said stillage utilizing a side stream.
22. The method of any preceding or following embodiment/feature/aspect, wherein said separation aid is added directly into said evaporator containing said stillage.
23. The method of any preceding or following embodiment/feature/aspect, wherein said separation aid is mixed with said stillage prior to entering said evaporator.
24. The method of any preceding or following embodiment/feature/aspect, wherein said separation aid further comprises silica.
25. The method of any preceding or following embodiment/feature/aspect, where said stillage has a solids content of from 5 wt % to 20 wt % when said separation aid is added to said stillage.
26. The method of any preceding or following embodiment/feature/aspect, wherein said stillage has a solids content below 30 wt % when said separation aid is added to said stillage.
27. The method of any preceding or following embodiment/feature/aspect, wherein said stillage is a by product from a corn fermentation process.
28. The method of any preceding or following embodiment/feature/aspect, wherein said stillage is a by product from a sugar cane fermentation process.
29. A separation aid composition comprising
   a) from 20 wt % to 50 wt % of at least one lecithin;
   b) from 20 wt % to 50 wt % of at least one oil; and
   c) from 0 wt % to 20 wt % of at least one surfactant having an HLB values of at least 9.
30. A treated stillage comprising the separation aid of any preceding or following embodiment/feature/aspect and stillage wherein said separation aid is present in an amount of at least 50 ppm.
31. The treated stillage of any preceding or following embodiment/feature/aspect, wherein said solids content of said treated stillage is from 5 wt % to 40 wt %.
32. A method for oil recovery from algae, comprising
   adding at least one separation aid to algae that contains oil, to form a treated algae prior to centrifuging said algae and
   centrifuging said treated algae in at least one centrifuge to separate at least a portion of said oil from said treated algae, wherein said separation aid comprises at least one lecithin and at least one oil and optionally at least one surfactant having an HLB value of at least 6.
33. A bio-oil recovery system, comprising
   a supply of biomass that comprises stillage or algae;
   a supply of separation aid, wherein said separation aid comprises at least one lecithin and at least one oil and optionally at least one surfactant having an HLB value of at least 6;
   a treatment unit for combining the separation aid with the biomass to form treated biomass; and
   a centrifuge for dewatering the treated biomass to produce concentrated bio-oil.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be only exemplary of the present invention. Unless indicated otherwise, all amounts, percentages, ratios and the like used herein are by weight.

EXAMPLES

Example 1

Bench testing was performed on stillage (16-18 wt % solids) coming from a fifth evaporator of an 8-stage evaporator used in a bioethanol production facility using corn feedstock, such as shown in FIGS. 1 and 3 herein and generally as described in the incorporated '182 patent. The withdrawn samples of stillage were mixed with various treatment compositions indicated in Table 1 by manually stirring the stillage with selected dosages of treatment composition, then pouring the resulting blends into measuring tubes, and the recovered oil products were observed and compared for clarity and volume. In Table 1, the treatment compositions 1 and 2 contained at least lecithin and oil. These compositions are separation aids which represent examples of the present invention. The other treatment compositions contained other combinations of chemicals and are comparison examples.

TABLE 1

| Treatment Composition No. | Dosage | Treatment Composition Formulation (in wt %) |
|---|---|---|
| Comparison 1* | 400 ppm | Hydrogenated soybean oil Mineral oil Surfactant |
| Comparison 2 | 400 ppm | 63% Polysorbate 60 26% Trans-402 11% propylene glycol |
| Comparison 3 | 400 ppm | 63% Tween 80 26% PD-602 11% propylene glycol |
| Comparison 4 | 200 ppm | 70% ethoxylated castor oil (ECO) 30% soybean oil |
| 1 | 200 ppm | 50% soy lecithin 50% mineral oil |

TABLE 1-continued

| Treatment Composition No. | Dosage | Treatment Composition Formulation (in wt %) |
|---|---|---|
| 2 | 200 ppm | 33% soy lecithin<br>33% mineral oil<br>33% ECO |
| Comparison 5** | 200 ppm | Ethoxylated oleic acid<br>Propylene glycol<br>Glycerine<br>Silica |
| Comparison 6 | 800 ppm | 70% PEG400DT<br>28% Polysorbate 60<br>2% silica |

*Magrabar PD-602 (Magrabar Chemical Corp., Morton grove, Illinois, US).
**Hydromaize 300 (Hydrite Incorporated).

Treatment compositions 1 and 2 were observed to provide better oil separation volume at lower dosage levels and comparable or better oil quality than the comparison test compositions 1, 2, 3, and 6 applied at higher dosage levels. Treatment compositions 1 and 2 were observed to provide better oil separation and oil quality than the comparison test compositions 4 and 5 at the same dosage levels. The results indicate that a synergism is obtained in oil separation by a combination of lecithin and oil as compared to the oils used in combination with each other and/or the indicated surfactants used in the comparison formulations.

Example 2

Additional bench testing was performed on stillage (16-18 wt % solids) coming from a fifth evaporator of an 8-stage evaporator used in a bioethanol production facility using corn feedstock, such as shown in FIGS. 1 and 3 herein and generally as described in the incorporated '182 patent. The withdrawn samples of stillage were mixed with various treatment compositions indicated in Table 2 (amounts provided in wt %) by manually stirring the stillage with the added treatment composition, pouring the resulting blends into measuring tubes, and visually comparing the recovered oils for clarity and volume to a Baseline product. The baseline product was a stillage sample treated with the Comparison 1 treatment composition as described in Example 1. Product 33 was stillage treated with the treatment composition 2 described in Example 1. All samples of stillage were dosed with 30 µl of treatment composition which is equivalent to approximately 550 ppm. Table 2 shows the results of the percent oil recovered compared to the indicated baseline sample. Trans 402 is from Trans-Chemco; Dow FC 114 and FC-149 are Fluent Cane Deformers that are E0-130 glycols from Dow Chemical; Agrol 2.0, 3.6, 4.3 are hydroxylated soybean oil from BioBased Technologies; Suppressor 3583 and 9905 Deformers are from Hydrite Inc.; HDP products are from Harcros; and the Dow Corning Antifoam and FG-10 products are silicone based.

TABLE 2

| Product | Treatment Composition | % of Baseline |
|---|---|---|
| 1 | 33% Trans 402; 33% Dow FC 114; 33% High Oleic Add | 0% |
| 2 | 33% Trans 402; 33% Dow FC 149; 33% High Oleic Acid | 60% |
| 3 | 33% Trans 402; 33% Dow FC 114; 33% Agrol 2.0 | 0% |
| 4 | 33% Trans 402; 33% Dow FC 149; 33% Agrol 2.0 | 65% |
| 5 | 33% Trans 402; 33% Dow FC 114; 33% Agrol 3.6 | 10% |
| 6 | 33% Trans 402; 33% FC 149; 33% Agrol 3.6 | 15% |
| 7 | 33% Trans 402; 33% Dow FC 114; 33% Agrol 4.3 | 10% |
| 8 | 33% Trans 402; 33% Dow FC 149; 33% Agrol 4.3 | 40% |
| 9 | Agrol 2.0 | 0% |
| 10 | Agrol 3.6 | 0% |
| 11 | Agrol 4.3 | 0% |
| 15 (O) | Dow Corning FG-10 | 0% |
| 16 (P) | Dow Corning Antifoam AF | 0% |
| 17 (Q) | Dow Corning Antifoam A | 5% |
| 18 (R) | Dow Corning Antifoam C | 0% |
| 19 (S) | Dow Corning Antifoam 1510 | 0% |
| 20 (T) | Dow Corning Antifoam 1510 | 10% |
| 21 (U) | 1,3 Propanediol | 5% |
| Baseline | Comp. 1 (Ex. 1) | 100% |
| 22 | Suppressor 3583 Defoamer | 65% |
| 23 | Suppressor 9505 Defoamer | 10% |
| 29 | Dow FC 149 Fluent Cane Defoamer | 45% |
| 30 | 100% Topcithin UB (unmodified lecithin) | 10% |
| 31 | 80% Topcithin UB, 20% trans 402 (canola fumed silica blend) | 35% |
| 33 | 1 (Ex. 1) | 110% |
| 34 | Ethoxylated Castor Oil | 75% |
| 35 | PEG ester: Oil blend | 15% |
| 36 | PEG 400 Di-tallate | 15% |
| 37 | monomer acid | 20% |
| 38 | tall oil fatty acid (TOFA) | 20% |
| 39 | EO/PO Butyl polymer | 10% |
| 40 | PEG ester blend | 10% |
| 41 | PEG Ester blend | 15% |

TABLE 2-continued

| Product | Treatment Composition | % of Baseline |
|---------|----------------------|---------------|
| 42 | PEG400 | 10% |
| 43 | EO/PO Ester | 80% |

As can be seen from the results in Table 2, product 33, in which the stillage was treated with the composition including lecithin and oil performed 10% better than the Baseline product in which the stillage was treated with the Comparison 1 composition, and 11 times greater in magnitude (i.e., 110% versus 10%) than the use of unmodified lecithin alone as the treatment composition in product 30. In addition, in further tests, the composition including lecithin and oil was observed to perform better over a wide range of conditions.

Example 3

Additional bench testing was performed on stillage (16-18 wt % solids) coming from a fifth evaporator of an 8-stage evaporator used in a bioethanol production facility using corn feedstock, such as shown in FIGS. 1 and 3 herein and generally as described in the incorporated '182 patent. The withdrawn samples of stillage were mixed with various treatment compositions manually stirring at the same dosage, pouring the resulting blends into measuring tubes, and visually comparing the recovered oils for clarity and amount to a Baseline product. The Baseline product was a stillage sample treated in-line at an evaporator pump with the Comparison 1 treatment composition as described in Example 1. Treated products designated 13864, 13865, 13866, and 1991 were prepared by treatment of withdrawn samples of the stillage from the evaporator with four different compositions of separation aids of the present invention. The Baseline product had its treatment composition added with aid of a pump, which added the treatment composition directly into the stillage. The samples treated with the treatment compositions in products 13864, 13865, 13866, and 1991 were manually mixed by hand from stillage collected from the evaporator, so there was a mixing factor involved that would be expected to provide an advantage to the comparison treatment done on the baseline product with in-line addition at the pump. The treatment composition used for product 13864 was the same as the treatment composition 2 described in Example 1. The treatment composition used for product 13865 was 40% Soy Lecithin, 40% Mineral Seal Oil and 20% Polysorbate 80. The 1991 product received a similar treatment composition as product 13864 wherein the treatment composition also contained 5% fumed silica.

Figure 6:
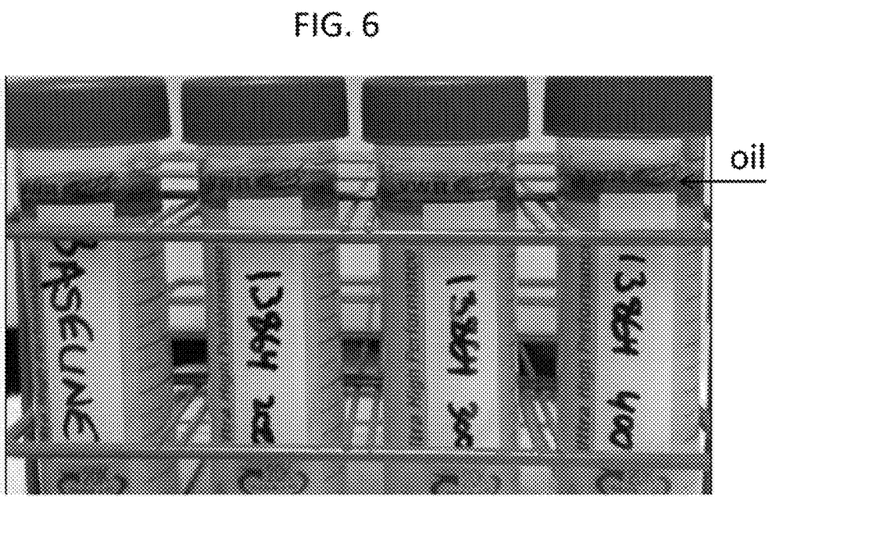
FIG. 6 are photographs showing corn oil testing according to an example of the present application wherein a product (13864) that has been treated with a separation aid of an example of the present application was compared to a Baseline product treated with a comparison formulation, at varying dosages of 200 ppm, 300 ppm, and 400 ppm.
Figure 7:
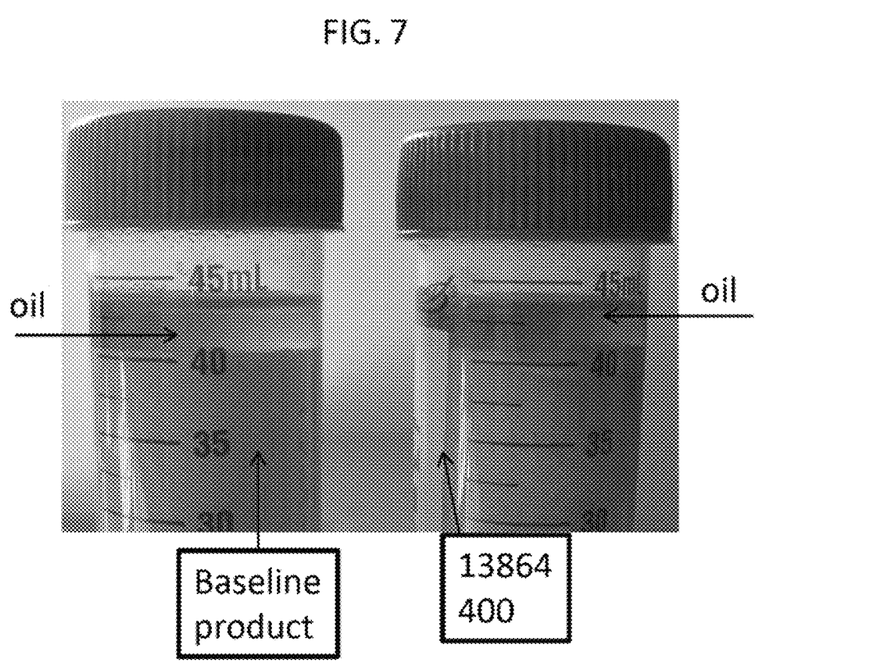
FIG. 7 are enlarged photographs of the product (13864) at the 400 ppm dosage as indicated in FIG. 6 that was treated with a separation aid of an example of the present application and the resulting product was compared to that of the Baseline product.

FIG. 6 shows photographs of 13864 product compared to the Baseline product at dosages of 200 ppm, 300 ppm, and 400 ppm. FIG. 7 shows photographs that compare the Baseline product with the product of 400 ppm dosage of 13864. As can be seen, the 13864 product has a distinct oil product layer at the top of the product material in the tube that is essentially the same level of corn oil as the Baseline product sample. Substantially similar results were observed for the 13865, 13866, and 1991 products compared to the Baseline products at similar dosage levels of treating composition, wherein the amount of oil recovered was comparable or better. The 13864, 13866 and the 1991 products in particular produced very good oil recovery results at 400 ppm. The combinations of stillage and separation aid representing examples of the present invention that were tested could produce the same or slightly more oil than the Baseline product, and at lower dosages.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for bio-oil recovery from a fermentation process, comprising
    adding at least one separation aid to stillage that contains oil, to form a treated stillage prior to centrifuging said stillage and
    centrifuging said treated stillage in at least one centrifuge to separate at least a portion of said oil from said treated stillage, wherein said separation aid comprises at least one lecithin and at least one oil and optionally at least one surfactant having an HLB value of at least 6.

2. The method of claim 1, wherein said adding occurs in at least one evaporator located upstream from said centrifuging.

3. The method of claim 1, wherein said fermentation process comprises a series of evaporators that said stillage enters sequentially and located upstream for said centrifuging, and wherein said adding of said at least one separation aid occurs just prior to or in at least one of said evaporators located closer to said centrifuge.

4. The method of claim 3, wherein said series of evaporators comprise at least 8 evaporators and said adding occurs just prior to or in the $5^{th}$, $6^{th}$, $7^{th}$, or $8^{th}$ evaporator.

5. The method of claim 1, wherein said at least one surfactant is present.

6. The method of claim 1, wherein said separation aid comprises:
    a) 30 wt % to 70 wt % of said lecithin;
    b) 30 wt % to 70 wt % of said oil;
    c) 0 wt % to 40 wt % of said surfactant.

7. The method of claim 6, wherein said separation aid comprises less than 1 wt % water.

8. The method of claim 6, wherein said separation aid comprises less than 1 wt % aromatic compounds.

9. The method of claim 6, wherein said separation aid comprises less than 1 wt % alcohol compounds.

10. The method of claim 6, wherein said separation aid is a food-grade or GRAS approved composition or mixture.

11. The method of claim 1, wherein said lecithin and said oil are present in a lecithin:oil weight ratio of from 0.8:1 to 1:0.8.

12. The method of claim 1, wherein said separation aid is added in an amount to be present in a ppm range of from about 200 ppm to 800 ppm.

13. The method of claim 1, wherein said oil is mineral oil, vegetable oil, or any combination thereof.

14. The method of claim 1, wherein said oil is a triglyceride oil or hydrocarbon based oil.

15. The method of claim 1, wherein said lecithin is an acetylated lecithin.

16. The method of claim 1, wherein said lecithin is soy lecithin or soy bean lecithin.

17. The method of claim 5, wherein said surfactant is ethoxylated castor oil or PEG surfactant.

18. The method of claim 5, wherein said surfactant is a non-ionic surfactant.

19. The method of claim 5, wherein said surfactant is a cationic or anionic surfactant.

20. The method of claim 5, wherein said surfactant has a HLB value of from 9 to 20.

21. The method of claim 1, wherein said separation aid is added to said stillage utilizing a side stream.

22. The method of claim 2, wherein said separation aid is added directly into said evaporator containing said stillage.

23. The method of claim 2, wherein said separation aid is mixed with said stillage prior to entering said evaporator.

24. The method of claim 1, wherein said separation aid further comprises silica.

25. The method of claim 1, where said stillage has a solids content of from 5 wt % to 20 wt % when said separation aid is added to said stillage.

26. The method of claim 1, wherein said stillage has a solids content below 30 wt % when said separation aid is added to said stillage.

27. The method of claim 1, wherein said stillage is a by product from a corn fermentation process.

28. The method of claim 1, wherein said stillage is a by product from a sugar cane fermentation process.

29. A treated stillage comprising a separation aid and stillage wherein said separation aid is present in an amount of at least 50 ppm and wherein said separation aid comprises
a) from 20 wt % to 50 wt % of at least one lecithin;
b) from 20 wt % to 50 wt % of at least one oil; and
c) from 0 wt % to 20 wt % of at least one surfactant having an HLB values of at least 9.

30. The treated stillage of claim 29, wherein said solids content of said treated stillage is from 5 wt % to 40 wt %.

31. A method for oil recovery from algae, comprising
adding at least one separation aid to algae that contains oil, to form a treated algae prior to centrifuging said algae and
centrifuging said treated algae in at least one centrifuge to separate at least a portion of said oil from said treated algae, wherein said separation aid comprises at least one lecithin and at least one oil and optionally at least one surfactant having an HLB value of at least 6.

32. A bio-oil recovery system, comprising
a supply of biomass that comprises stillage or algae;
a supply of separation aid, wherein said separation aid comprises at least one lecithin and at least one oil and optionally at least one surfactant having an HLB value of at least 6;
a treatment unit for combining the separation aid with the biomass to form treated biomass; and
a centrifuge for dewatering the treated biomass to produce concentrated bio-oil.

33. The method of claim 5, wherein said surfactant is at least one sulfonate.

34. The method of claim 5, wherein said surfactant is at least one acetylenic glycol.

35. The treated stillage of claim 29, wherein said separation aid comprises less than 1 wt % water.

36. The treated stillage of claim 29, wherein said separation aid comprises less than 1 wt % aromatic compounds.

37. The treated stillage of claim 29, wherein said separation aid comprises less than 1 wt % alcohol compounds.

38. The treated stillage of claim 29, wherein said separation aid is a food-grade or GRAS approved composition or mixture.

39. The treated stillage of claim 29, wherein said lecithin and said oil are present in a lecithin:oil weight ratio of from 0.8:1 to 1:0.8.

40. The treated stillage of claim 29, wherein said oil is mineral oil, vegetable oil, or any combination thereof.

41. The treated stillage of claim 29, wherein said oil is a triglyceride oil or hydrocarbon based oil.

42. The treated stillage of claim 29, wherein said lecithin is an acetylated lecithin.

43. The treated stillage of claim 29, wherein said lecithin is soy lecithin or soy bean lecithin.

44. The treated stillage of claim 29, wherein said at least one surfactant is present.

45. The treated stillage of claim 44, wherein said surfactant is ethoxylated castor oil or PEG surfactant.

46. The treated stillage of claim 44, wherein said surfactant is a non-ionic surfactant.

47. The treated stillage of claim 44, wherein said surfactant is a cationic or anionic surfactant.

48. The treated stillage of claim 44, wherein said surfactant has a HLB value of from 9 to 20.

49. The treated stillage of claim 29, wherein said separation aid further comprises silica.

50. The treated stillage of claim 29, wherein said surfactant is at least one sulfonate.

51. The treated stillage of claim 29, wherein said surfactant is at least one acetylenic glycol.

* * * * *